(12) United States Patent
Lee et al.

(10) Patent No.: US 8,746,944 B2
(45) Date of Patent: Jun. 10, 2014

(54) LIGHT GUIDE APPARATUS HAVING A LIGHT SOURCE AND A REFLECTOR

(75) Inventors: Hsin Chin Lee, Waterloo (CA); Bergen Albert Fletcher, Kitchener (CA); Antanas Matthew Broga, Cambridge (CA)

(73) Assignee: BlackBerry Limited, Waterloo (CA)

( * ) Notice: Subject to any disclaimer, the term of this patent is extended or adjusted under 35 U.S.C. 154(b) by 198 days.

(21) Appl. No.: 13/304,908

(22) Filed: Nov. 28, 2011

(65) Prior Publication Data

US 2013/0135892 A1 May 30, 2013

(51) Int. Cl.
*F21V 7/04* (2006.01)

(52) U.S. Cl.
USPC .......................... 362/608; 362/612; 362/609

(58) Field of Classification Search
USPC .................. 362/608–609, 612–613
See application file for complete search history.

(56) References Cited

U.S. PATENT DOCUMENTS

| 5,202,950 | A | 4/1993 | Arego et al. |
| 6,435,685 | B2 * | 8/2002 | Matsushita ............... 362/608 |
| 7,604,388 | B2 * | 10/2009 | Nishio et al. ............. 362/608 |
| 7,980,746 | B2 * | 7/2011 | Tsuchiya et al. ......... 362/609 |
| 2002/0172030 | A1 | 11/2002 | Matsumoto et al. |
| 2004/0001345 | A1 | 1/2004 | Lee et al. |
| 2005/0007756 | A1 | 1/2005 | Yu et al. |
| 2007/0002586 | A1 | 1/2007 | Soh et al. |
| 2007/0008739 | A1 * | 1/2007 | Kim et al. ................ 362/612 |
| 2007/0047262 | A1 | 3/2007 | Schardt et al. |
| 2007/0058392 | A1 | 3/2007 | Watanabe et al. |
| 2007/0081360 | A1 | 4/2007 | Bailey et al. |
| 2007/0165419 | A1 | 7/2007 | Horiuchi et al. |
| 2010/0232098 | A1 | 9/2010 | Chung et al. |
| 2011/0032727 | A1 | 2/2011 | Kinder et al. |

FOREIGN PATENT DOCUMENTS

| EP | 2280300 A1 | 2/2011 |
| EP | 2372416 A1 | 10/2011 |
| EP | 2372417 A1 | 10/2011 |
| JP | 2006 286348 A | 10/2006 |
| WO | 20090099547 A2 | 8/2009 |

OTHER PUBLICATIONS

Agilent Technologies, "Light Guide Techniques Using LED Lamps", Application Brief I-003, downloaded from http://www.ciri.org.nz/downloads/Lightpipe%20design.pdf on Aug. 31, 2011.
Extended European Search Report issued on corresponding EP Appln. No. 11190885.1 dated Aug. 24, 2012.

* cited by examiner

*Primary Examiner* — Robert May

(74) *Attorney, Agent, or Firm* — Ridout & Maybee LLP (57) ABSTRACT

A light guide apparatus for an electronic device is described. The light guide apparatus includes a light guide having a first surface and an second surface; a light source, the light guide and the light source being arranged to couple light from the source into the light guide through the second surface of the light guide, the second surface and the light source defining a gap therebetween; and a reflector positioned above the light source and the light guide, and extending over at least a portion of the gap and at least a portion of the front surface of the light guide.

20 Claims, 6 Drawing Sheets

LIGHT GUIDE APPARATUS HAVING A LIGHT SOURCE AND A REFLECTOR

FIELD OF TECHNOLOGY

The present disclosure relates to light guide apparatuses, and especially a light guide apparatus comprising a light source and a light guide.

BACKGROUND

Light guides are often used in electronic devices to provide illumination or backlighting to display screens, keypads, or other components. The light guide spreads light from a light source located at an edge of the light guide. With the development of thinner and smaller electronic devices, there is a need for improved light guide apparatus design.

BRIEF DESCRIPTION OF THE DRAWINGS

Embodiments of the present disclosure will now be described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

According to one example is a light guide apparatus including a light guide having a first surface and a second surface; a light source, the light guide and the light source being arranged to couple light from the source into the light guide through the second surface of the light guide, the second surface and the light source defining a gap therebetween; and a reflector positioned above the light source and the light guide, and extending over the gap and at least a portion of the front surface of the light guide.

Light guides are commonly used in electronic devices to distribute or guide light from a source to a particular point or area. In some examples, the light guide may provide backlighting for a display such as an LCD display. In some examples, the light guide may provide backlighting for one or more keys, navigation devices or other input devices. In some examples, the light guide may guide light to illuminate portions of a device bezel or any other component of the device. In some examples, the light guide may guide light to be emitted from an aperture of the device. In some examples, the light guide may distribute or guide light for any combination of uses.

Figure 1:
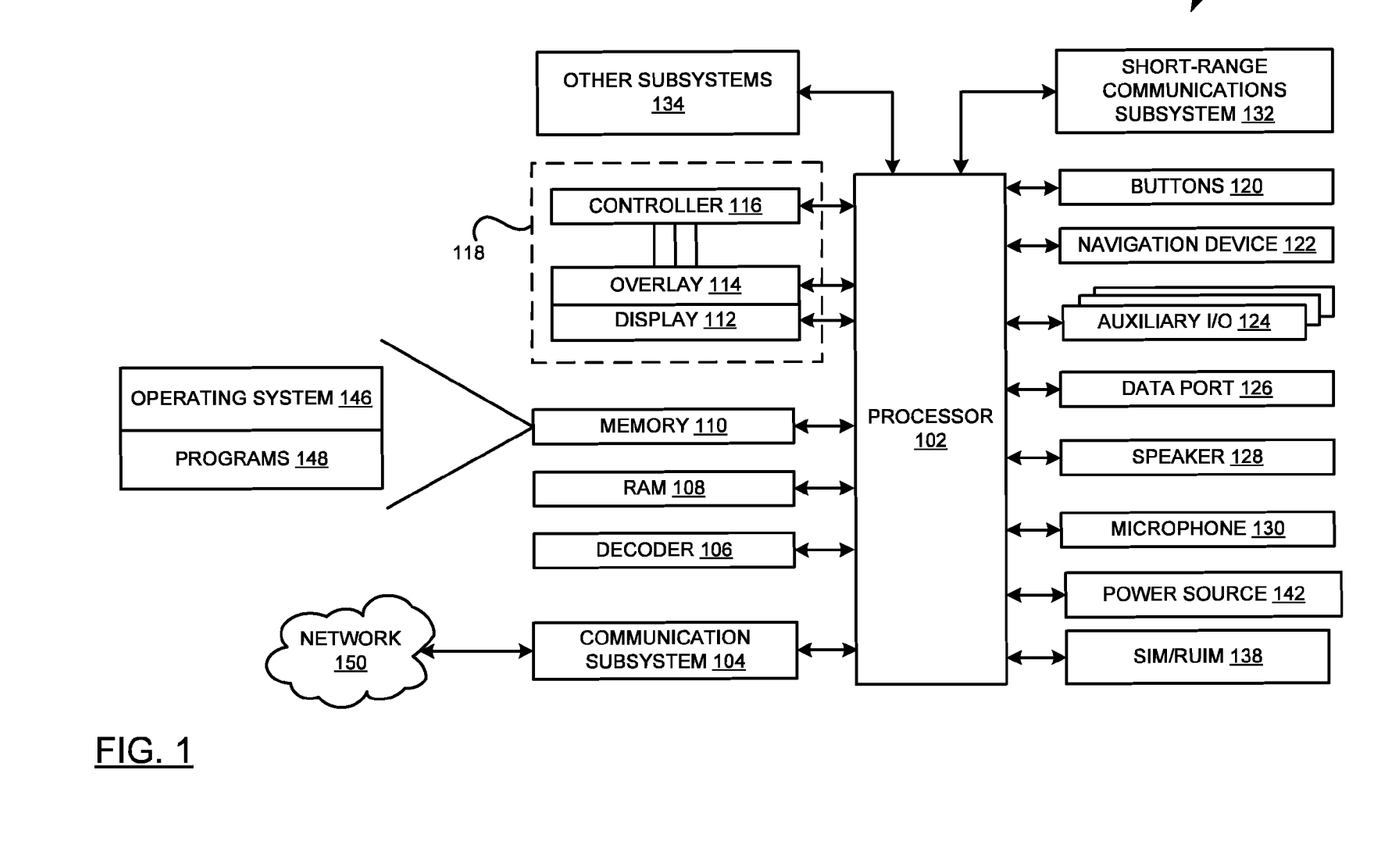
FIG. 1 is a simplified block diagram of components including internal components of a electronic device according to an example embodiment.

Reference is made to FIG. 1, which illustrates in block diagram form, a mobile device 100 to which example embodiments described in the present disclosure can be applied. The mobile device 100 includes multiple components, such as a processor 102 that controls the overall operation of the mobile device 100. Communication functions, including data and voice communications, are performed through a communication subsystem 104. Data received by the mobile device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the mobile device 100.

The processor 102 interacts with other components, such as Random Access Memory (RAM) 108, memory 110, a display 112 (such as a liquid crystal display (LCD)) with a touch-sensitive overlay 114 coupled to an electronic controller 116 that together comprise a touch-sensitive display 118, one or more keys or buttons 120, a navigation device 122, one or more auxiliary input/output (I/O) subsystems 124, a data port 126, a speaker 128, a microphone 130, short-range communications subsystem 132, and other device subsystems 134. It will be appreciated that the electronic controller 116 of the touch-sensitive display 118 need not be physically integrated with the touch-sensitive overlay 114 and display 112. User-interaction with a graphical user interface (GUI) is performed through the touch-sensitive overlay 114. The GUI displays user interface screens on the touch-sensitive display 118 for displaying information or providing a touch-sensitive onscreen user interface element for receiving input. This content of the user interface screen varies depending on the device state and active application, among other factors. Some user interface screens may include a text field sometimes called a text input field. The processor 102 interacts with the touch-sensitive overlay 114 via the electronic controller 116. Information, such as text, characters, symbols, images, icons, and other items that may be displayed or rendered on a mobile device, is displayed on the touch-sensitive display 118 via the processor 102.

The auxiliary I/O subsystems 124 could include other input devices such as one or more control keys, a keyboard or keypad, navigational tool (input device), or both. The navigational tool may be a depressible (or clickable) joystick such as a depressible optical joystick, a depressible trackball, a depressible scroll wheel, or a depressible touch-sensitive trackpad or touchpad. The other input devices could be included in addition to, or instead of, the touch-sensitive display 118, depending on the embodiment.

One or more light guide apparatuses (not shown) may provide backlighting or illumination to the display 112, keys or buttons 120, navigation device 122, other input devices, the device bezel, apertures, or any combination thereof. In some example embodiments, the one or more light guide apparatuses may be controlled by a controller, such as the electronic controller 116, or by the processor 102 to adjust the intensity, colour, lighting effect, or any other attribute of the light provided by the light guide.

To identify a subscriber for network access, the mobile device 100 uses a Subscriber Identity Module or a Removable User Identity Module (SIM/RUIM) card 138 for communication with a network, such as the wireless network 150. Alternatively, user identification information may be programmed into memory 110.

The mobile device 100 includes an operating system 146 and software programs or components 148 that are executed by the processor 102 and are typically stored in a persistent, updatable store such as the memory 110. Additional applications or programs may be loaded onto the mobile device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the mobile device 100 is similar. The speaker 128 outputs audible information converted from electrical signals, and the microphone 130 converts audible information into electrical signals for processing.

Embodiments of the present disclosure may be applied to any light guide apparatus with an interface between a light source and a light guide. Embodiments of the present disclosure may be applied to mobile devices including but not limited to mobile phones, tablet or laptop computers, personal media players, gaming devices, imaging devices, e-readers and GPS devices. Embodiments of the present disclosure may also be applied to devices such as televisions, monitors, signs, dashboards, control panels, or keyboards. The present disclosure may be applied to any other light guide application and is not necessarily limited to the examples described herein.

Figure 2:
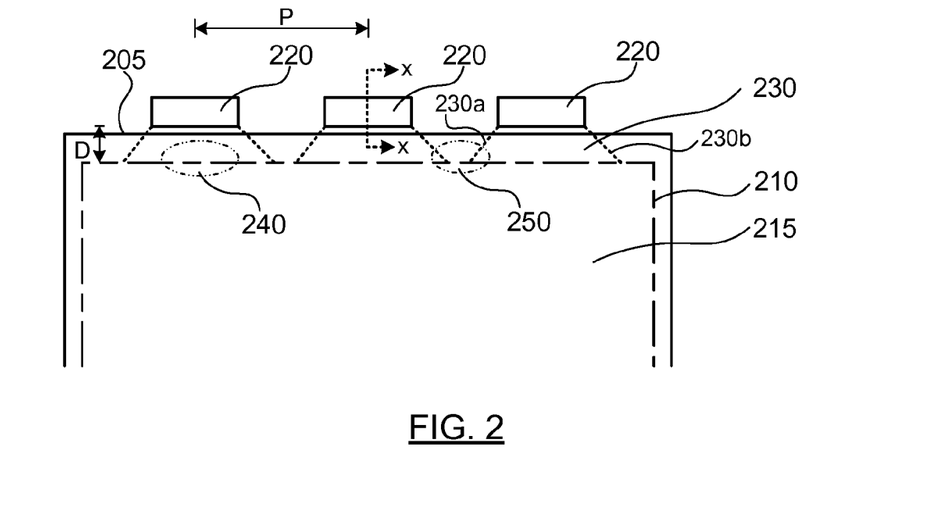
FIG. 2 is a partial front cutaway view of an example of an example light guide apparatus.

Reference is made to FIG. 2, which illustrates a partial front cutaway view of a light guide 210 and a series of light sources 220. The example light guide 210 in FIG. 2 is illustrated as a plate or panel which, for example, may provide backlighting to a display. However, the example embodiments described in the present disclosure may be applied to any shape or type of light guide.

Light is provided to the light guide by one or more light sources 220. The light sources may be light emitting diodes (LEDs), fluorescent lamps such as cold cathode fluorescent lamps (CCFLs), incandescent bulbs, or any other suitable light source. As illustrated in FIG. 2, the light sources 220 may provide light to a surface such as an edge surface 205 of the light guide. While the shape of the light provided by the light sources may be any shape, the example light beams 230 in FIG. 2 are illustrated in part by the area between the dotted lines 230a and 230b.

At a distance D from the light sources, the light beams 230 may form an active area 215 of the light guide which exhibits a more uniform distribution of light. The active area 215 may be the area of the light guide used to provide light for backlighting a display screen or other uses. The areas outside the active area may not be suitable for backlighting as they may exhibit larger variances in light. Areas directly in line with a light source 220 may result in hot or bright spots 240 which exhibit greater illumination than the areas around them. Similarly, areas between light sources may result in dark spots 250 which exhibit less illumination than the areas around them.

In examples such as an LCD display backlight, the LCD may be positioned over the active area of the light guide for more uniform backlighting. Other components or layers including but not limited to diffusers and polarizers may be positioned between the light guide and the display. Areas outside the active area may be unsuitable for uniform backlighting and may be masked by reflectors or other layers or components. Additional components and layers such as masks, reflectors, diffusers or additional light guides may be included to shape or otherwise adjust light from the light guide 210.

In other examples, keypads and other components requiring more uniform illumination or backlighting may be positioned over the active area of the light guide. Other components or layers including but not limited to masks, diffusers, polarizers, reflectors, and additional light guides may be included to shape otherwise adjust light from the light guide 210.

In FIG. 2, three light sources 220 are all positioned along the edge surface 205 of the light guide 210; however, in other examples, a single light source or any number of light sources may be positioned along the edge surface 205 of the light guide. In some examples, the one or more light sources may be positioned along any number of sides of the light guide 210.

Figure 3:
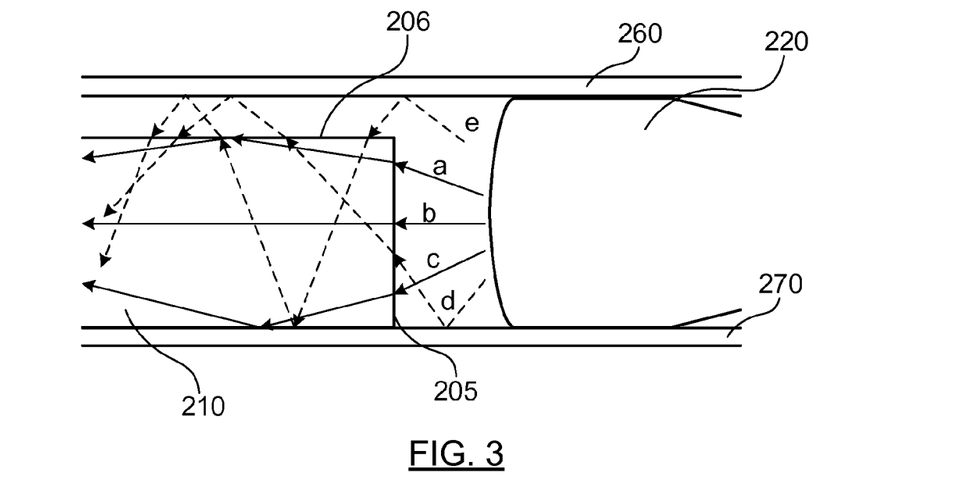
FIG. 3 is an example partial cross-sectional view of a light guide apparatus as seen from x-x in FIG. 2.

Referring to FIG. 3, a partial, cross-sectional view of an example light guide apparatus is illustrated. Light provided by the light source 220 is directed at an edge surface 205 of the light guide 210. A first reflector 270 is positioned under the light guide 210 and light source 220, and a second reflector 260 is positioned over the light guide 210 and light source 220.

The arrows in FIG. 3 illustrate ray traces of light provided by the light source 220 and passing through the light guide 210. Rays travelling along paths a, b, and c, as illustrated by the solid-lined arrows, hit the light guide edge surface 205 with a small angle of incidence and exhibit total internal reflection (TIR) within the light guide 210. For example, as ray "a" travels from the light source 220, it hits the edge surface 205 of the light guide with a small angle of incidence and refracts as it passes into the light guide 210. Within the light guide, ray "a" hits the front surface 206 of the light guide with a large angle of incidence and reflects back into the light guide, and although not shown in FIG. 3, ray "a" may continue to travel within the light guide reflecting off the first reflector 270 and the top surface of the light guide. Similarly, ray "c", once within the light guide 210, reflects off the first reflector 270 at a large angle of incidence and may continue to exhibit TIR within the light guide.

In contrast, ray "d", illustrated by a dotted line, does not exhibit TIR. Ray "d" travels from the light source 220, hits the edge surface 205 of the light guide with a large angle of incidence and subsequently hits the front surface 206 of the light guide at an angle less than the critical angle thereby passing out of the light guide. The ray reflects off the second reflector 260 and re-enters the front surface 206 of the light guide with a small angle of refraction. Although not shown, ray "d" may continue its path by reflecting off the first reflector 270 and then by again exiting the front surface 206 of the light guide.

Ray "e", which starts by reflecting off the second reflector 260 before entering the light guide 210 via the front surface 206, exhibits a similar non-TIR path between the reflectors.

Light rays which do not substantially exhibit TIR within the light guide may result in hot spots, light leakage, or light exiting the light guide in undesired areas or at undesired angles. In some examples, undesired light effects may be reduced by increasing the size of the gap between the light source 220 and the light guide 210, or by increasing the distance D between the light source 220 and the active area 215 of the light guide.

Figure 4:
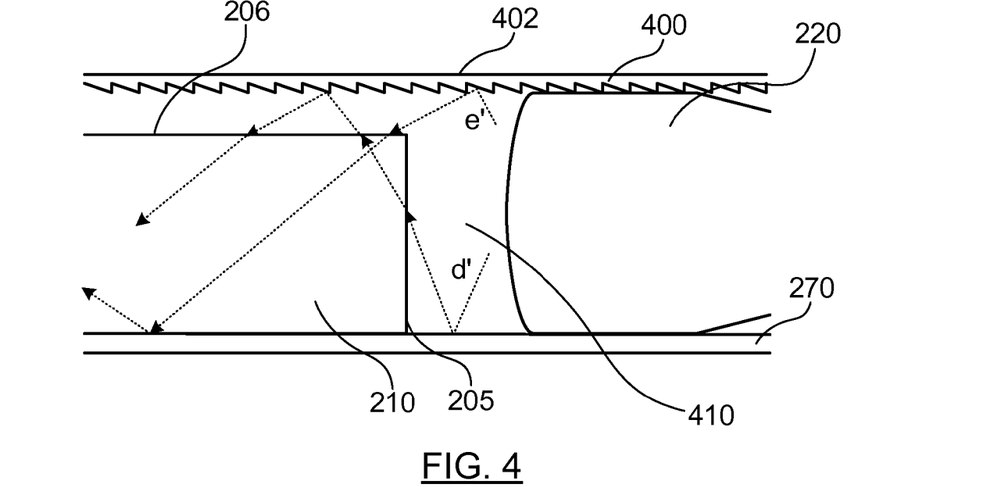
FIGS. 4 through 12 are additional example partial cross-sectional views of example light guide apparatuses having prism reflectors.

Referring to FIG. 4, a partial, cross-sectional view of another example light guide apparatus is illustrated. Light provided by the light source 220 is directed at an edge surface 205 of the light guide 210. A first reflector 270 is positioned under the light guide 210 and light source 220, and a prism reflector 400 is positioned over the light guide 210 and light source 220.

The light source 220 is positioned to provide light to the light guide 210. In FIG. 4, the light source 220 is illustrated as having a greater height than the light guide 210. However, in some examples, the light source 220 may having a smaller height than the light guide or may have any other size, shape or orientation suitable for coupling with the light guide 210. In some examples, the light source may provide white light or a full spectrum of light. In some examples, the light source may provide light having a specific wavelength, or having a range or combination of wavelengths. In some examples, the light source may provide light at different intensities. In some examples, the light source may be controlled by a controller or processor. The controller or processor may be configured to adjust the light source's intensity, colour, modulating frequency, lighting pattern or effect, or to turn the light source on and off.

The light guide 210 is positioned to receive light from the light source 220. The light guide may be made of any material or combination of materials suitable for conveying or dispersing light. Examples may include, but are not limited to poly (methyl methacrylate) (PMMA), glass, polycarbonate, silicone rubber, and fiber optic material. The type of material may be different for different types of light guides. For example, a light guide for a display backlight may include a greater proportion of PMMA, while a light guide for a keypad backlight may include more silicone rubber.

The first reflector 270 extends under the gap 410 between the light source 220 and the light guide 210, and at least a portion of the light guide 210. Light incident on the first reflector 270 is reflected back towards the light guide 210. In some examples the first reflector 270 is a single reflective material. In other examples, the first reflector 270 may include a number of different optic films or layers. In some examples, the first reflector 270 includes an enhanced specular reflector (ESR) film. In different examples, the first reflector may or may not directly abut the light guide 210 and/or the light source 220.

The prism reflector 400 is illustrated as extending over the entire light source 220, gap 410, and the illustrated portion of the front surface 206 of light guide 210. However, in some examples, the prism reflector 400 may not extend over the light source 220 or may only extend over a portion of the light source 220. In some examples, the prism reflector 400 may only extend over a portion of the gap 410. In some examples, the prism reflector 400 extends over only a portion of the front surface 206 of the light guide.

The prism reflector 400 changes the angle of reflection of light incident on the prism reflector 400. For example, ray e' travels from the light source 220 and is initially incident on the prism reflector 400 with a relatively small angle of incidence. Based on the prism reflector's 400 shape and characteristics, the ray e' leaves the prism reflector 400 at an angle of reflection/refraction greater than the angle of incidence with respect to the planar base surface 402. The ray e' enters the light guide at the front surface 206 of the light guide 210 at an angle which may allow for TIR within the light guide. By comparison, ray e' has a larger initial angle of incidence on the light guide than the initial angle of incidence of ray e in FIG. 3.

Ray d' is similarly affected by the prism reflector 400. As seen in FIG. 4, after first passing through the light guide, ray d' exits the front surface 206 of the light guide and is incident on the prism reflector 400 with a small angle of incidence. Based on the prism reflector's design, ray d' leaves the prism reflector 400 having a larger angle of reflection/refraction with respect to the planar base surface 402. The ray d' re-renters the light guide at the front surface 206 at a larger angle which may allow for TIR within the light guide.

In some examples, by adjusting the angle of incident light rays, the prism reflector 400 reduces light rays which pass in and out of the light guide 210 as they reflect between first and second reflectors as illustrated for example by rays d and e in FIG. 3. In some examples, the prism reflector 400 may increase the amount of light which exhibits TIR as it passes through the light guide.

Figure 5:
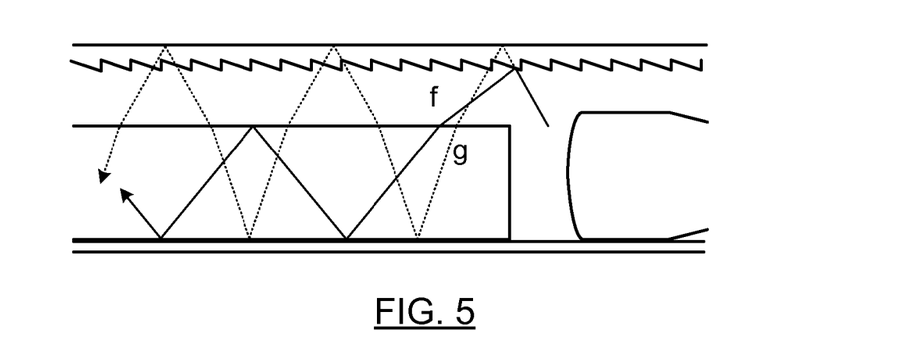

To further illustrate this, FIG. 5 shows the paths of two different light rays both leaving the light source at the same initial angle. The solid path illustrates the path of a light ray f which passes through a prism reflector, while the dotted path illustrates the hypothetical path of a light ray g which reflects off a flat reflector. The prism reflector adjusts the path of ray f such that it passes into the light guide with a larger angle of incidence on the light guide allowing for TIR.

Figure 6:
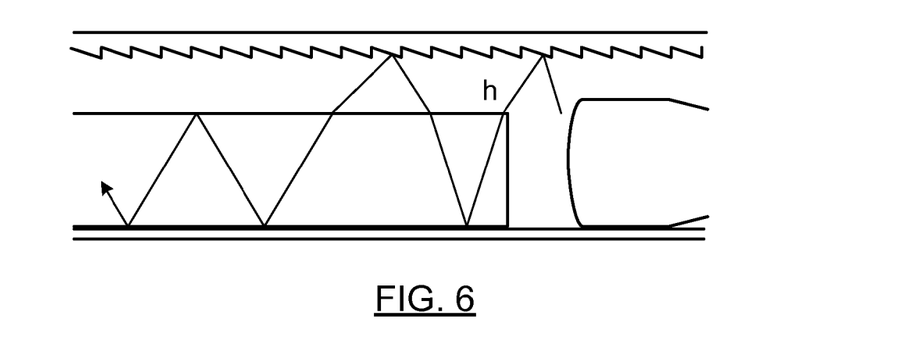

FIG. 6 shows the path of a light ray h which passes through the prism reflector twice before its angle of incidence on the light guide is sufficient for TIR. Some light rays may pass through the prism reflector multiple times before they enter the light guide at a sufficient angle for TIR.

In the above examples, the light rays are illustrated as reflecting off the surface of the prism reflectors; however, in some examples, the prism reflector may adjust the path of incident light rays by refracting light as it passes through a portion of the prism reflector. In these examples, light is reflected off a reflective layer such as the planar base surface 402 and is also refracted by the prism structures to adjust the path of the incident light rays.

In some examples, the prism reflector 400 may reduce hotspots, dark spots, light leakage, light exiting the light guide at undesired angles, or other undesired light effects. In some examples, the prism reflector may increase light efficiency by reducing light transmission losses.

In some examples, the prism reflector 400 may allow for a smaller gap 410 between the light source 220 and the light guide 210 without significantly decreasing TIR or increasing undesired light effects. In some examples, the prism reflector may allow for a smaller distance D (see FIG. 2) between the light source 220 and an active area 215 of the light guide without significantly decreasing TIR or increasing undesired light effects.

In some examples, having a smaller distance D between the light source and the active area may allow the light guide 210 to have a larger active area 215. Similarly, in some examples, the prism reflector may allow for larger useable display areas, smaller bezels around display screens and key pads, or smaller device designs.

In the above examples, the light guide is illustrated as having a flat edge surface 205. However, the edge surface 205 may be any shape suitable for receiving light from the light source 220. In some examples, the edge surface 205 may be shaped to increase coupling efficiency with the light source 220 or to reduce any reflection, refraction or other undesired light effects.

Figure 7:
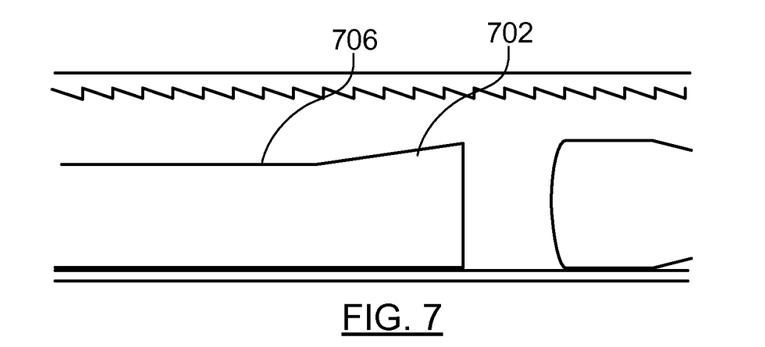

In the examples above, the light guide is illustrated as a planar light guide with a flat front surface 206. However, in other examples, the light guide may be a light tube or any other shaped light guide. In some examples, the light guide may have a non-planar front surface. For example, in FIG. 7, the light guide has a flange 702 extending toward the prism reflector. In this example, the front surface 706 is non-planar as it is defined in part by the front portion of the flange. In some examples, the light guide may have flanges or any other shape to increase coupling efficiency, or to decrease hot spots or other undesired light effects.

Figure 8:
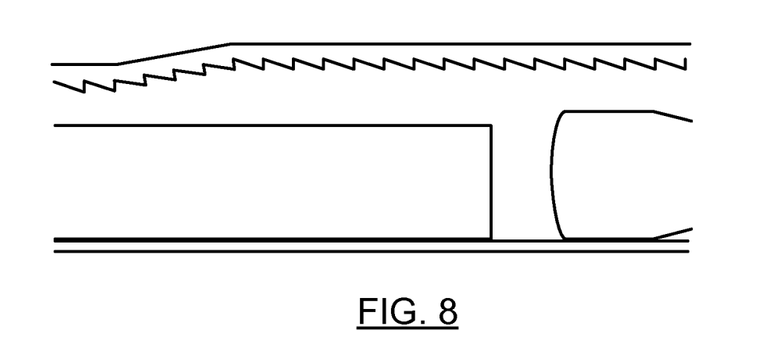

As illustrated in FIG. 8, in some examples, the prism reflector may not be planar. FIG. 8 shows an example non-planar prism reflector. In some examples, the shape of the prism reflector may be designed to increase coupling efficiency or to decrease hot spots or other undesired light effects. In some examples, the space between the prism reflector and front surface of the light guide may decrease until the prism reflector abuts the front surface.

Figure 9:
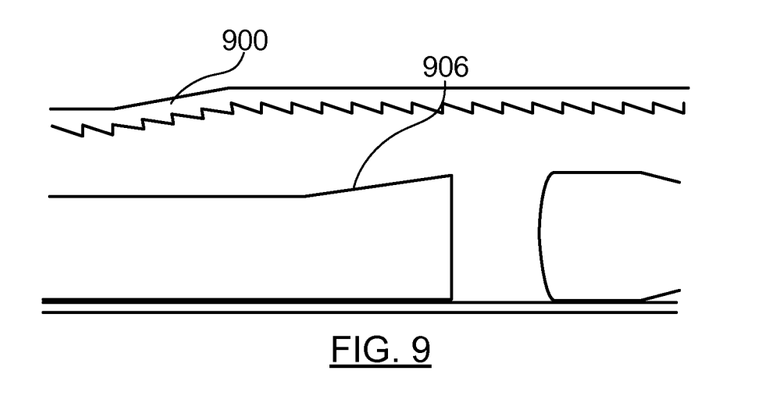

In some examples, the shape of the prism reflector may correspond to the shape of the light guide. For example, in FIG. 9, the prism reflector has an inclined portion 900 which corresponds to the incline of the flange portion of front surface 906 of the light guide.

Figure 10:
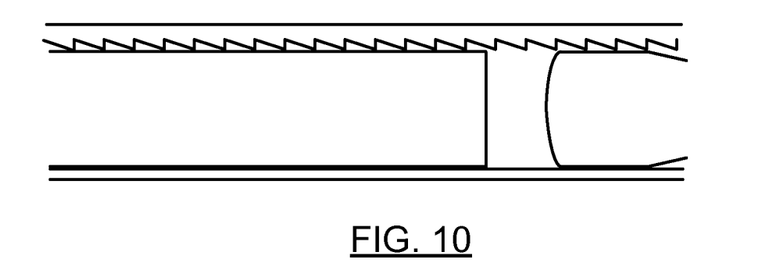
Figure 11:
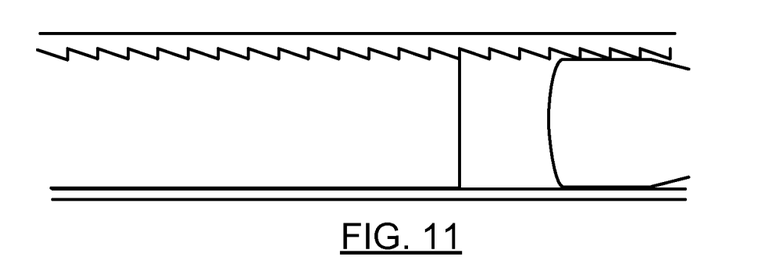

In some examples, as illustrated by FIG. 10, the prism reflector may abut the light guide and/or the light source. In some examples, as illustrated by FIG. 11, at least a portion of the prism reflector surface and at least a portion of the light guide front surface may be coupled or may be in direct contact. The alternative spacings (or lack of spacing) between the light guide and the prism reflector may apply to any combination of differently shaped light guides and prism reflectors.

Figure 12:
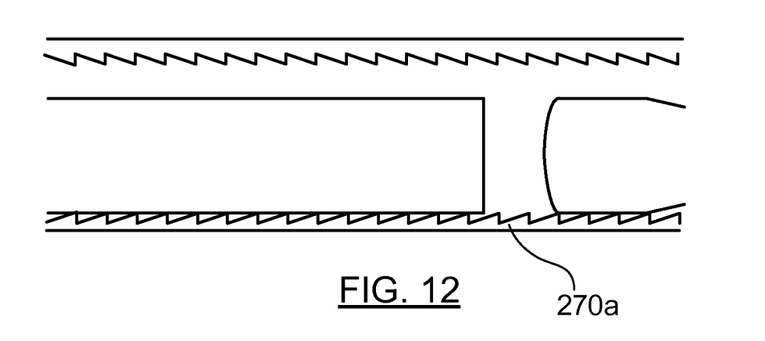

In any of the above examples, the first reflector 270 may be a prism reflector. An example of this is illustrated in FIG. 12 by lower prism reflector 270a. In any of these examples, the lower prism reflector may extend under at least a portion of the gap 410, and at least a portion of the light guide 210. The lower prism reflector 270a may, in addition to prism reflector 400, adjust the path of light reflecting off the lower prism reflector 270a to increase TIR in the light guide 210, or to otherwise adjust the angle of reflection/refraction of light incident on the lower prism reflector.

While the light ray traces in the above examples are illustrated as having two-dimensional paths, it is to be understood that the light rays travel and may have their paths adjusted by a prism reflector in all three dimensions. In some examples, the prism reflector may be configured to increase the width of the light beam 230 (see FIG. 2) as it enters and is conveyed along the light guide 210. In some examples, the prism reflector may be configured to diffuse light entering the light guide 210 to reduce hot spots 240 or dark spots 250. In some examples, the prism reflector may spread or diffuse light to allow fewer light sources to be used to light the light guide 210. In some examples, the prism reflector may spread or diffuse light to allow the distance P (see FIG. 2) between light sources to be increased.

In some examples, the light sources may be positioned closer together, and the prism reflector may be configured to direct or diffuse light to reduce hot spots created by overlapping beams of light from adjacent light sources.

The prism reflector, as applicable to any of the above examples, will now be discussed in greater detail. A prism reflector may include one or more prism formations configured to adjust the angle of reflection/refraction of light incident on the prism reflector.

In the example cross-sectional views above, a prism formation on the prism reflector appears as a triangular cross-section. In some examples, the triangular cross-section may be the cross-section of a long prism extending into and out of the page. In other examples, the triangular cross-section may represent a single triangular or pyramidal prism which is part of a row of prisms extending into and out of the page.

In some examples, the prisms may be uniformly shaped and sized. In other examples, the prisms may be different shapes and or sizes. In some examples the prism formations may be triangular (as illustrated, for example, by the cross-section in FIG. 13), rectangular, pentagonal, pyramidal, spherical wedges (as illustrated, for example, by the cross-section in FIG. 14), or any other polyhedron or shape suitable for refracting or reflecting light.

Figure 13:
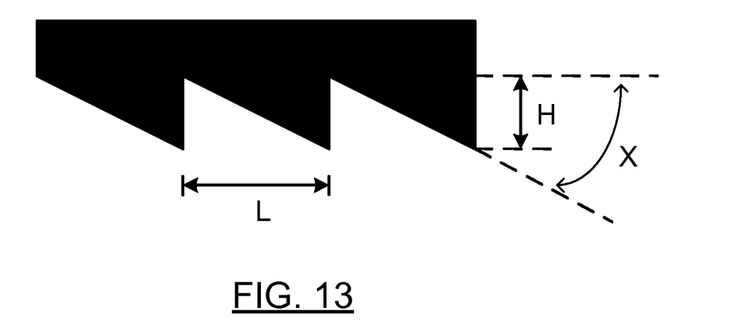
FIGS. 13 and 14 are example partial cross-sectional views of example prism reflectors.
Figure 14:
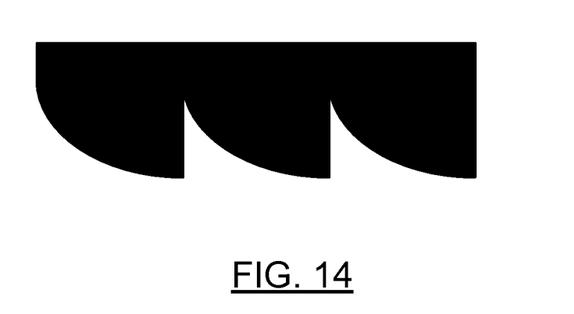

With reference to FIG. 13, triangular prism formations may have any suitable height H, length, and angle of incline X. In some examples, the triangular prism formations may have right angle cross-sections as illustrated in FIG. 13. In some of these examples, the triangular prism formations may have angles of incline X of between 1 and 10 degrees. In other examples, the triangular pyramids may not have right-angle cross-sections.

In some examples, the prism formations in one portion of the prism reflector may be different that the prism formations in another portion to direct light in different manners for the different portions of the light guide. For example, prism formations near the sides of the light guide may be configured to direct light away from the sides of the light guide.

The prism reflector may be made of any optically suitable material, any reflective material or combination of materials. In some examples, the prism reflector may be made of polyethylene terephtahlate (PET), glass, PMMA, polycarbonate, silicone rubber, any other light transmissive material or any reflective material such as white reflective material, specular reflective material or multi-layer stack structures. In some examples, the prism reflector may also include a reflective material such as ESR, or white or reflective coatings to reflect light from a base layer of the prism reflector. In some examples, the prism reflector may also include a mask or absorbing layer such as black ink printing to reduce any light which is not fully reflected or refracted back toward the light guide. In some examples, the prism reflector may also include protective and/or adhesive coatings.

In some examples, the index of refraction of the material of the prism formations or other portions of the light guide may be customized to the wavelengths of light provided by the light source. In some examples, the index of refraction of the prism reflector material may be customized to the index of refraction of the light guide.

In some examples, the prism reflector may have a random or pseudo-random prism surface design to increase light scattering. The increased light scattering may improve backlight uniformity, reduce hot spots or dark spots, or may allow for a decreased distance D between the light source and the active area of the light guide.

In some examples, the prism reflector may have a base material such as PET with prism formations added by microreplication techniques such as UV microreplication. In some examples, a prism film may be added to the base material. In some examples, the base and prism structure may be moulded or extruded as a single piece. In some examples, prisms may be formed on the base material by creating depressions, notches or holes in the base material, or by otherwise removing material from the base material.

In some examples, a reflective layer may cover, coat or otherwise be added to the surface of the prism formations.

While the embodiments described herein are directed to particular implementations of light guide apparatuses, it will be understood that modifications and variations may occur to those skilled in the art having read the present disclosure. All such modifications and variations are believed to be within the sphere and scope of the present disclosure.

What is claimed is:

1. A light guide apparatus comprising:
a light guide having a first surface and a second surface;
a light source, the light guide and the light source being arranged to couple light from the source into the light guide through the second surface of the light guide, the second surface and the light source defining a gap therebetween; and
a reflector positioned to extend over at least a portion of the gap and at least a portion of the first surface of the light guide;
the reflector comprising one or more prism formations, at least one of the one or more prism formations including a first reflective surface oriented towards the light source and the first reflective surface being substantially perpendicular to the first surface of the light guide.

2. The light guide apparatus of claim 1, wherein the reflector is configured to adjust an angle of light incident thereon to achieve total internal reflection of such light within the light guide.

3. The light guide apparatus of claim 1, wherein at least one of the one or more prism formations has a semi-circular or triangular cross-section.

4. The light guide apparatus of claim 3, wherein at least one of the one or more prism formations has a triangular cross-section with a base angle of between 1 and 10 degrees.

5. The light guide apparatus of claim 3 wherein at least one of the one or more prism formations has a right angle triangular cross-section.

6. The light guide apparatus of claim 1 wherein there is a plurality of prism formations and the prism formations are uniformly shaped and sized.

7. The light guide apparatus of claim 1 wherein at least one of the one or more prism formations is a triangular, or pyramidal prism.

8. The light guide apparatus of claim 1, wherein at least a portion of the reflector abuts or is coupled to a portion of the first surface.

9. The light guide apparatus of claim 1, wherein the reflector comprises a random prism surface design.

10. The light guide apparatus of claim 1 comprising two or more light sources arranged to supply light to the light guide, wherein the reflector is configured to reduce overlapping light supplied from adjacent light sources.

11. The light guide apparatus of claim 1 wherein at least a portion of the reflector has an index of refraction corresponding to a wavelength of light provided by the light source or corresponding to an index of refraction of the light guide.

12. The light guide apparatus of claim 1 wherein the reflector further comprises a base material.

13. The light guide apparatus of claim 12 wherein the one or more prism formations are added to the base material by microreplication or by coupling a prism film to the base material.

14. The light guide apparatus of claim 12 wherein the one or more prism formations are formed on the base material by creating depressions, notches or holes in the base material.

15. The light guide apparatus of claim 1 further comprising a second reflector positioned to extend across at least a portion of the gap and at least a portion of a third surface of the light guide.

16. The light guide apparatus of claim 15 wherein the second reflector comprises one or more prism formations, at least one prism formation of the second reflector including a second reflective surface oriented towards the light source and the second reflective surface being substantially perpendicular to the third surface of the light guide.

17. The light guide apparatus of claim 1 wherein the reflector is configured to redirect light incident thereon back towards the light guide away from the light source, along a substantially entire length of the light guide.

18. An electronic device comprising
a backlight, wherein the backlight comprises:
a light guide having a first surface and a second surface;
a light source, the light guide and the light source being arranged to couple light from the source into the light guide through the second surface of the light guide, the second surface and the light source defining a gap therebetween; and
a reflector positioned to extend over at least a portion of the gap and at least a portion of the first surface of the light guide;
the reflector comprising one or more prism formations, at least one of the one or more prism formations having a first reflective surface oriented towards the light source and the first reflective surface being substantially perpendicular the first surface of the light guide.

19. The electronic device of claim 18 further comprising a display or a keypad, wherein the backlight provides backlighting for the display or the keypad.

20. The electronic device of claim 18 wherein the reflector is configured to adjust an angle of light incident thereon to achieve total internal reflection of such light within the light guide.

* * * * *